Patented June 15, 1926.

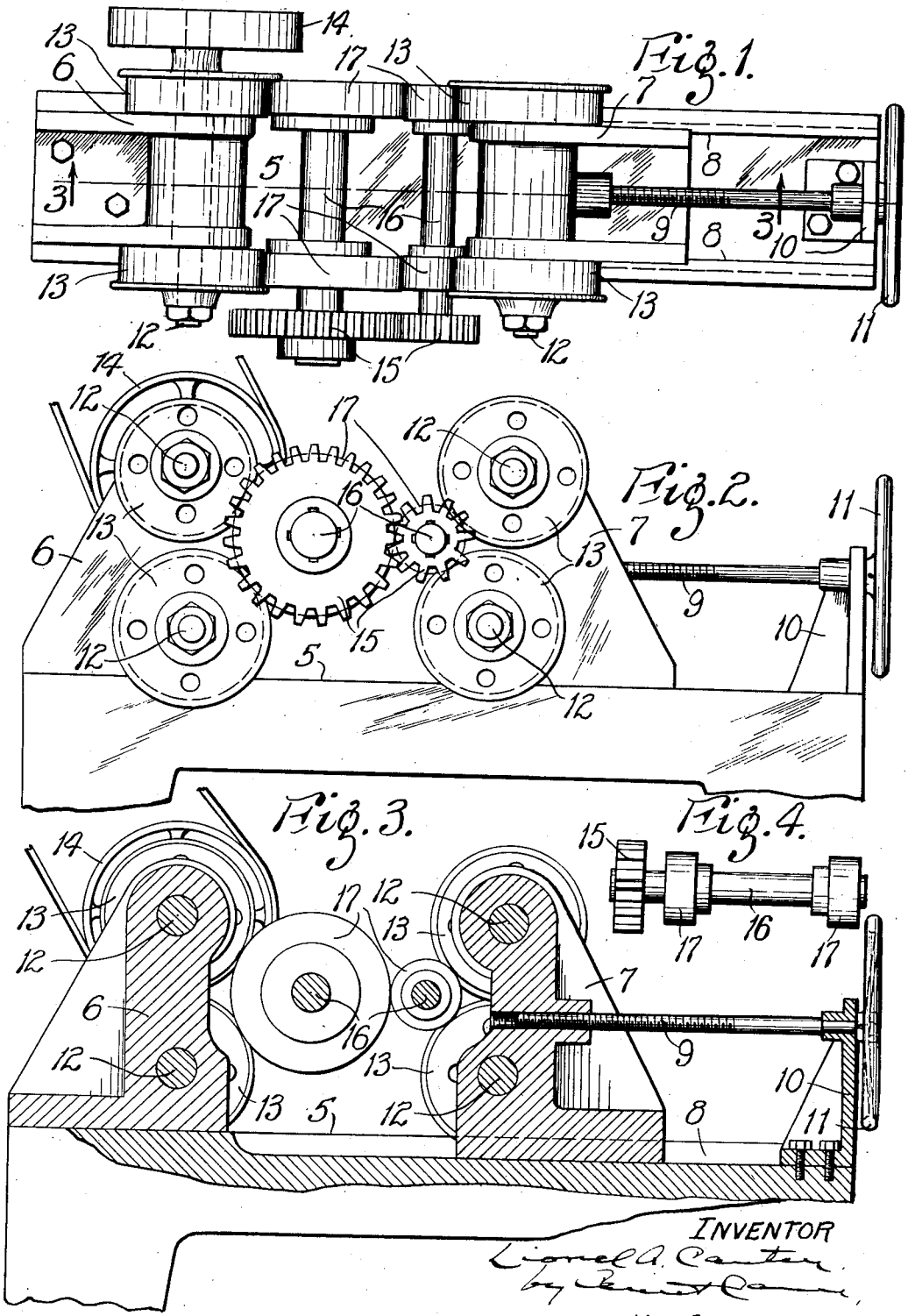

1,589,310

UNITED STATES PATENT OFFICE.

LIONEL A. CARTER, OF ST. LOUIS, MISSOURI.

GEAR-LAPPING MACHINE.

Application filed July 5, 1924. Serial No. 724,339.

This invention relates to machines for lapping or "running in" gears to correct inaccuracies in outline or position of the teeth of the gears that are to be intermeshed in service so as to insure their smooth and noiseless operation.

One of the principal objects of the present invention is to produce a simple and accurate gear lapping machine that can be quickly and easily adjusted for gears of different sizes. Another object is to enable the gears to be readily placed in position in the machine and removed therefrom. Other objects are cheapness in construction and compactness in design.

The invention consists in the combinations and arrangements of parts hereinafter described and claimed.

In the accompanying drawing, which forms part of this specification and wherein like symbols refer to like parts wherever they occur, Fig. 1 is a plan view of a gear lapping machine embodying my invention;
Fig. 2 is a side elevation of the machine;

Fig. 3 is a vertical central longitudinal section through the machine on the line 2—2 in Fig. 1; and Fig. 4 is a side elevation of one of the gear arbors showing the gear thereon.

The present gear lapping machine comprises a bed or table 5 a stationary head or standard 6 and a movable head or standard 7. The stationary head 6 is bolted or otherwise rigidly secured to the bed 5 at one end thereof; and the movable head 7 is disposed in a slideway 8 that extends longitudinally of said bed. The slidable head 7 is moved towards and away from the stationary head 6 by means of a long adjusting screw 9 whose inner end portion is threaded through a threaded bore in said slidable head. The outer end of the adjusting screw 9 is rotatably supported in a bracket 10 fixed to the adjacent end of the bed 5 and is provided with a hand-wheel 11, whereby the screw can be conveniently rotated to adjust the slidable head towards and away from said stationary head.
The two heads 6 and 7 are each provided with a pair of gear holders comprising two horizontally disposed parallel shafts 12 disposed transverse to the longitudinal axis of the feed screw 9. The shafts 12 are journaled in suitable bearings provided therefor in the heads 6 and 7 and the two shafts of each head are disposed one above the other with their axes in the same vertical plane. The upper shafts of the heads 6 and 7 are arranged with their axes in the same horizontal plane; and likewise, the lower shafts of said heads are arranged with their axes in the same horizontal plane. The shafts 12 extend on opposite sides of the respective heads a distance sufficient to accommodate friction wheels or rollers 13 that are rigidly secured in any desired manner to the ends of the shafts for rotation therewith. As shown in the drawing, one of the shafts 12, preferably the upper shaft of the stationary head 6, is driven by means of a belt pulley 14, which is secured to one end of the shaft outside of the friction wheel on said end.

The gears 15 that are to be lapped or "run in" before being placed in service are each pressed on the ends of separate shafts or arbors 16. Each shaft or arbor 16 has fixed thereon two friction wheels or rollers 17 that are spaced apart a distance corresponding to the spacing of the friction wheels or rollers 13 on the shafts 12, the diameter of the two friction rollers 17 on each arbor 16 being very close to the exact pitch diameter of the gear 15 thereon.

The operation of the device is as follows: The gears 15 that are to be lapped or "run in" are first secured to separate gear arbors 16 having friction wheels 17 thereon of a diameter corresponding substantially to the pitch diameter of the gears secured thereto. One of the gear arbors is then placed in position with its friction wheels 17 in contact with the friction wheels 13 on the shafts 12 journaled in the stationary head 6. The other gear arbor is then arranged with its friction wheels in contact with the friction wheels on the shafts journaled in the movable head 7. The movable head is then moved in the direction of the stationary head by means of the hand-wheel 11 and feed-screw 9, whereby the friction wheels 17 at the ends of the gear arbors 16 are brought into frictional contact with each other and with the friction wheels 13 journaled in the heads 5 and 6 thereby bringing the gears 15 fixed to said gear arbors into mesh with each other. The shafts 12 and gear arbors 16 are then put into motion by driving the pulley 14 on the end of the uppermost one of the two shafts in the stationary head 6; and oil mixed with an abrasive material is applied in any desired manner to the intermeshing gears while they are being thus rotated.

By the arrangement described, the teeth of the intermeshing gears 15 are given the same kind of motion as the friction wheels or "pitch cylinders" 13 by which they are driven. Thus, tooth errors that project beyond the proper tooth curve are first removed, after which progressive refinement takes place until each tooth has been worn perfectly smooth and to an accurate fit with the teeth of the other gear with which it comes into mesh. Teeth that have incorrect positions and are thicker than the final shape may be corrected by making the friction wheels or "pitch cylinders" 17 on one gear arbor of slightly larger diameter than the pitch diameter of the gear thereon, whereby the teeth of the gear on the other arbor will exert a pressure on one side of the teeth of said first mentioned gear. By reversing the direction of rotation, the side pressure will be exerted on the opposite sides of the teeth. The friction wheels 13 on the shafts 12 are provided at their outer corners with circumferential flanges adapted to overlap the outer edges of the friction wheels 17 on the gear arbors and thereby prevent endwise movement thereof.

Obviously the hereinbefore described device admits of considerable modification without departing from the invention; therefore I do not wish to be limited to the precise construction or operations heretofore described. For instance, it may be desirable to fasten the gears on the arbors after the same are in position. It may also be desirable to mount a plurality of gears of the same pitch diameter on a single arbor.

What I claim is:

1. A gear lapping machine comprising two pairs of rotatably mounted friction wheels relatively movable transversely, the friction wheels of each pair being spaced apart, means for driving one of said wheels and separate holders for the gears that are to be lapped, said holders being adapted to be removably positioned between said pairs of friction wheels and having cylindrical surfaces adapted to contact with each other and with each friction wheel of a pair, the cylindrical surfaces of said gear holders being of a diameter corresponding substantially to the pitch diameter of the gears thereon.

2. A gear lapping machine comprising two pairs of friction wheels mounted for rotation on horizontally disposed parallel axes, means for driving one wheel of a pair, the friction wheels of each pair being disposed one above the other in substantially the same vertical plane and spaced apart vertically, the upper friction wheels of said pairs being disposed in the substantially same horizontal plane and the lower friction wheels of said pairs being disposed in the substantially same horizontal plane, means for varying the distance between each pair of friction wheels, and separate holders for the gears that are to be lapped, said gear holders being arranged between the two pairs of friction wheels and having cylindrical surfaces adapted to contact with each other and with each friction wheel of a pair, the cylindrical surfaces of said holders being of a diameter corresponding substantially to the pitch diameter of the gears thereon.

3. A gear lapping machine comprising a pair of relatively movable standards, a pair of parallel shafts journaled in each of said standards with their axes disposed transverse to the direction of movement of said standards, means for driving one of said shafts, friction wheels secured to each of said shafts, the friction wheels of each pair being spaced apart, and separate arbors for the gears that are to be lapped, said gear arbors being adapted to be removably positioned between the friction wheels on said pair of standards, and friction wheels secured to each of said gear arbors and adapted to contact with each other and with the friction wheels on said shafts whereby said gear arbors and the gears thereon are supported solely by the friction wheel on said parallel shafts.

4. A gear lapping machine comprising a pair of relatively movable standards, a pair of parallel shafts journaled in each of said standards with their axes disposed transverse to the direction of movement of said standards, means for driving one of said shafts, friction wheels secured to each of said shafts, out of contact with each other and separate arbors for the gears that are to be lapped, said gear arbors being adapted to be removably positioned between the friction wheels on said pair of standards, and friction wheels secured to each of said gear arbors and adapted to contact with each other and with the friction wheels for said shafts, the friction wheels on said gear arbors being of a diameter corresponding substantially to the pitch diameter of the gears thereon, the cooperating friction wheels on said shafts and said gear arbors having overlapping portions adapted to prevent endwise movement of said gear arbors.

5. A gear lapping machine comprising a bed having a fixed standard and a standard arranged for movement along said bed towards and away from said fixed standard, a pair of parallel shafts journaled in each of said standards with their axes disposed transverse to the direction of movement of said movable standard, means for rotating one of said shafts, friction wheels secured to each of said shafts, and separate arbors for the gears that are to be lapped and friction wheels secured to each of said gear arbors, the friction wheels on said gear arbors being of a diameter corresponding substantially to the pitch diameter of the gears thereon, said gear arbors being adapted to be removably positioned between the pairs of friction wheels on said fixed and said movable standards and means for moving said movable standard toward said fixed standard to bring the friction wheels on said gear in contact with each other and with the friction wheels on the shafts journaled in said standards.

6. A gear lapping machine comprising a pair of standards, a pair of parallel shafts journaled in each of said standards, said standards being relatively movable in directions transverse to the axes of said shafts, friction wheels secured to each of said shafts, and separate arbors for the gears that are to be lapped, said gear arbors being adapted to be arranged between the friction wheels on said pair of standards, friction wheels secured to each of said gear arbors and adapted to contact with each other and with the friction wheels on said pairs of shafts, the friction wheels on said gear arbors being of a diameter corresponding substantially to the pitch diameter of the gears thereon, and means for preventing endwise movement of said gear arbors relative to said shafts.

Signed at St. Louis, Missouri, this 30 day of June, 1924.

LIONEL A. CARTER.